United States Patent

[11] 3,590,182

| [72] | Inventors | Robert L. Beckhardt<br>Towson;<br>Richard T. Walter, Baltimore, both of, Md. |
|---|---|---|
| [21] | Appl. No. | 885,484 |
| [22] | Filed | Dec. 16, 1969 |
| [45] | Patented | June 29, 1971 |
| [73] | Assignee | The Black and Decker Manufacturing Company<br>Towson, Md. |

[54] ARTICLE FEEDER AND DELIVERY MECHANISM HAVING A SHUTOFF SWITCH
2 Claims, 4 Drawing Figs.

[52] U.S. Cl. .................................................... 200/61.41,
302/2 R
[51] Int. Cl. ...................................................... H01h 3/16
[50] Field of Search ............................................ 200/61.41,
61.42, 61.2, 61.21; 221/10; 302/2

[56] References Cited

UNITED STATES PATENTS

| 3,042,454 | 7/1962 | Eissmann | 302/2 |
| 3,206,063 | 9/1965 | Ricard et al. | 221/10 |
| 2,541,376 | 2/1951 | Nelson | 200/61.41 X |
| 2,877,776 | 3/1959 | Hoke | 221/10 UX |
| 3,175,057 | 3/1965 | Winslow | 200/61.41 |

*Primary Examiner*—Robert K. Schaeffer
*Assistant Examiner*—M. Ginsburg
*Attorneys*—Leonard Bloom, Joseph R. Slotnik and Edward D. Murphy

ABSTRACT: A mechanism including a rotatable motor driven drum which feeds headed studs to a delivery tube adapted to be connected to a stud gun. A normally closed switch, in series with the drum-driving motor, is opened momentarily each time a stud is fed to the delivery tube. When studs fill the delivery tube to a preselected extent, the switch remains open and the motor turns off.

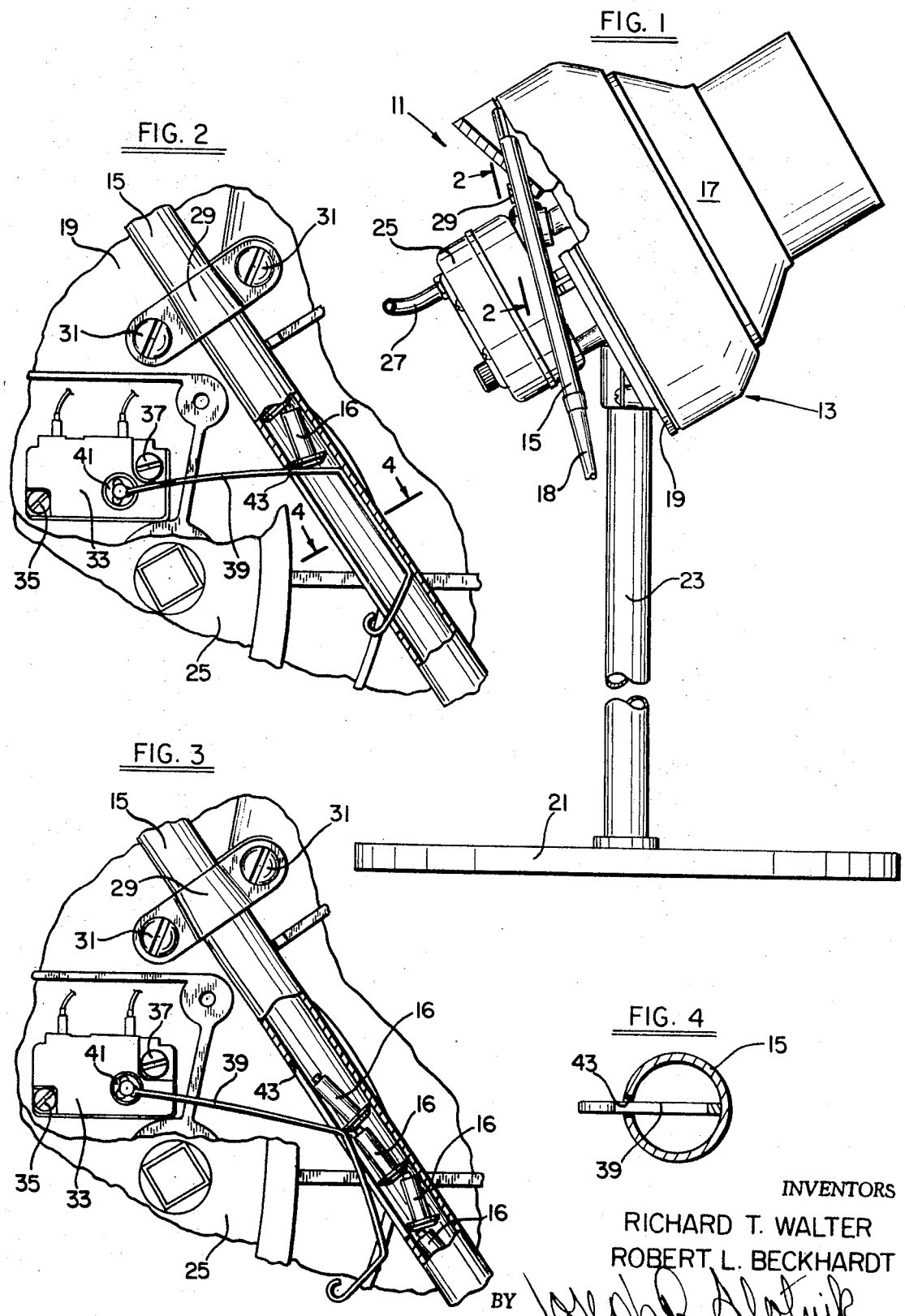

3,590,182

ARTICLE FEEDER AND DELIVERY MECHANISM HAVING A SHUTOFF SWITCH

SUMMARY OF THE INVENTION

The present invention is directed to a novel article feed and delivery mechanism and control therefor which automatically ceases operation upon accumulation of a predetermined quantity of unexpended articles in the delivery apparatus. When this quantity is reduced, the mechanism automatically resumes operation.

Main objects of the present invention, therefore, are to provide a novel motor driven, article feed and delivery mechanism including control means therefor, adapted to automatically control on-off motor operation in response to the need for delivered articles, and which thereby eliminates unnecessary motor operation and prevents jamming of the mechanism.

Further important objects of the present invention are to provide a novel mechanism of the above character which is simple and inexpensive, which is adapted for ready use in a variety of devices and installations without extensive redesign or modification, and is reliable in use.

BROAD STATEMENT OF THE INVENTION

Broadly described, the present invention relates to a feed and delivery mechanism comprising a motor driven feeder, chute means adapted to receive free-falling articles from said feeder and deliver said articles to a remote location, normally closed switch means adapted to control on-off operation of said motor driven feeder, said switch means including a trip lever normally biased into said chute means to be engaged and moved by each of said articles after they pass into said chute means from said feeder, said trip lever being engaged by one or more of said articles to hold said switch means open when said articles accumulate in said chute means to the level of said trip lever, whereby said motor driven feeder remains off, said trip lever moving back into said chute to turn said motor driven feeder on when said accumulation of said articles in said chute means falls below said level.

Other objects and advantages of the present invention will become more apparent from a consideration of the detailed description to follow taken in conjunction with the drawings annexed hereto.

BRIEF DESCRIPTION OF THE DRAWINGS

FIG. 1 is an elevational view illustrating one type of feed and delivery mechanism embodying the present invention and shown with parts broken away and in section for clarity;

FIG. 2 is an enlarged view, partly in section, taken substantially along the line 2-2 of FIG. 1 and looking in the direction of the arrows, illustrating the position of the parts when the drive motor is "on";

FIG. 3 is a view similar to FIG. 2 and showing the position of the parts when the motor is "off"; and FIG. 4 is an enlarged sectional view of the structure of FIG. 2 taken along the line 4-4 thereof.

DETAILED DESCRIPTION

Referring now specifically to the drawings, an article feed and delivery mechanism embodying the present invention is illustrated generally at 11 in FIG. 1 and is seen to include a hopper or feeder 13 adapted to feed individual articles which are positioned therein to delivery chute means, here a rigid tube 15 and a flexible tube 18. The illustrated embodiment depicts an apparatus for feeding and delivering headed studs 16 (FIGS. 2 and 3) to a stud gun (which is not shown but to which the flexible tube 18 is detachably connected) for insertion into the tread of automobile tires. However, it will be understood that this particular illustration is exemplary and that the present invention has broad application to a motor driven article feed and delivery mechanism regardless of the end use to which the articles are put or the particular shape thereof.

With this in mind, the feeder 13 is seen to include a hollow drum 17 supported for rotation about an inclined axis. The drum 17 preferably is open at both ends, having a larger, lower end closed by a stationary end plate assembly 19 which also provides bearing support for the drum 17. The end plate 19 in turn, is suitably supported such as upon a pedestal 21 and upright post 23. An electric motor 25, also fixed to the end plate 19, rotates the drum 17 and is connected to an electric power source through a line cord 27.

The drum 17 is constructed in a well known manner to feed the studs 16, which may be delivered thereto through the upper end of the drum 17, in a head-first direction to the upper end of the delivery tube 15. As shown, this end of the tube 15 may extend into an opening in the end plate 19 and is fixed thereto by a clamp 29 and screws 31. The other end of the tube 15 is connected to the flexible tube 18 which, in turn, is connected to a stud gun (not shown).

In use, the headed studs 16 are randomly poured into the open end of the drum 17. The motor causes the drum 17 to turn and the latter orients and feeds the studs 16, head-down, into the top of the delivery tube 15. The studs 16 in the tube 15 are delivered, by gravity, compressed air, or otherwise, through the flexible tube 18 to the stud gun (not shown).

Desirably, the feed and delivery mechanism builds up an accumulation of oriented and delivered studs 16 ready for insertion into tire treads. However, it will be appreciated that when a sufficient accumulation of studs is achieved, such as when the delivery tube 15 is substantially filled, continued operation of the feeder 13 is unnecessary and undesirable. This is so because the accumulated studs can jam the feeder and because continued feeder operation causes wear on the motor 25.

It is conceivable that at this point the feeder 13 could be turned off manually; however, it must be turned on again when the accumulated supply of studs 16 in the delivery tube 15 is reduced. Thus, it will be appreciated that the need exists for a simple and effective control device which will turn the feeder on and off automatically as required.

Turning now to FIGS. 2-4, an electric switch 33 is secured to the cover plate 19 by screws 35, 37 near the top of the delivery tube 15. The switch 33 is connected in series with the electric motor 25 and is normally closed so that when the line cord 27 is connected to an electric power source, the motor 25 is energized and studs 16 within the drum 17 are fed into the top of the delivery tube 15. A trip lever 39 is pivoted to the switch 33 at 41 and extends into an opening 43 in the delivery tube 15. The trip lever 39 is normally biased toward the position shown in FIG. 2 in which position the switch 33 is on. When, however, the trip lever 39 is pivoted in a clockwise direction against this biasing force to the position shown in FIG. 2, the switch 33 is turned off.

Thus, as each of the studs 16 move through the delivery tube 15 (either by gravity, air pressure, or otherwise), it engages and pivots the trip lever 39 from the FIG. 2 or closed position to the FIG. 3 or open position. As long as an accumulation of studs 16 has not built up in the delivery tube 15 back to the trip lever 39, each stud 16 moves past the trip lever 39 so that the switch 33 is open and the feed motor 25 turned off only momentarily. In fact, the momentum of the motor 25 and feed drum 17 is such that no perceptible interruption occurs to the feed and delivery cycle.

However, when a sufficient accumulation of studs 16 builds up in the delivery tube 15, the trip lever 39 is held in the FIG. 3 position and the switch 33 remains open and the motor 25 stays off. Thereafter, as the accumulation of studs 16 in the tube 25 is reduced, the trip lever 39 will return to the FIG. 2 position so that the switch 33 is closed and the motor 25 turns on.

It will be appreciated that control of the motor 25 is achieved by a single moving part, that being the trip lever 39. Thus, the delivery tube 15 is wholly left intact and is unchanged except for the slot 43 which accommodates the trip lever 39. In this way, the basic switch 33 and trip lever 39 arrangement can be used in a variety of different feed and delivery mechanisms with little or no modification required thereof.

In practice, a switch 33 and trip lever 39 of the type illustrated has been found to be extremely reliable and durable. Thus, faultless performance through more than a million cycles of operation has been achieved.

By the foregoing, there has been disclosed an improved automatically controlled feed and delivery mechanism calculated to fulfill the inventive objects set forth hereinabove, and while a preferred embodiment has been illustrated and described above, various additions, substitutions, modifications and omissions may be made thereto.

We claim:

1. A feed and delivery mechanism comprising a motor driven feeder, chute means for receiving free-falling articles from said feeder and deliver said articles to a remote location, normally closed switch means connected to the motor to control on-off operation of said motor driven feeder, said switch means including a trip lever and a switch, said switch normally biasing said trip lever into said chute means to be engaged and moved by each of said free-falling articles after they pass into said chute means from said feeder to momentarily open said switch means whereby said feeder remains operative as a result of its momentum, said trip lever being engaged by one or more of said articles to hold said switch means open when said articles accumulate in said chute means to the level of the article engagement with said trip lever; whereby said motor driven feeder remains off, said trip lever moving back into a position in said chute means to turn said motor driven feeder on when said accumulation of said articles in said chute means falls below said level.

2. A mechanism as defined in claim 1 wherein said chute means is substantially a closed tube, an aperture in said tube receiving said trip lever.

UNITED STATES PATENT OFFICE
CERTIFICATE OF CORRECTION

Patent No. 3,590,182           Dated June 29, 1971

Inventor(s) ROBERT L. BECKHARDT AND RICHARD T. WALTER

It is certified that error appears in the above-identified patent and that said Letters Patent are hereby corrected as shown below:

COLUMN 1, LINES 42-59, SHOULD BE INSERTED AFTER LINE 24.

Signed and sealed this 30th day of May 1972.

(SEAL)
Attest:

EDWARD M. FLETCHER, JR.
Attesting Officer

ROBERT GOTTSCHALK
Commissioner of Patents

FORM PO-1050 (10-69)